Nov. 11, 1924.  
J. A. DARSIE ET AL  
HEADLIGHT  
Filed Aug. 5, 1921

INVENTORS  
James A. Darsie  
George Darsie  
by M. G. Doolittle  
Attorney.

Nov. 11, 1924.

J. A. DARSIE ET AL 1,515,095

HEADLIGHT

Filed Aug. 5, 1921    2 Sheets-Sheet 2

INVENTORS
James A. Darsie
George Darsie
by M. F. Doolittle
Attorney

Patented Nov. 11, 1924.

1,515,095

UNITED STATES PATENT OFFICE.

JAMES A. DARSIE AND GEORGE DARSIE, OF PITTSBURGH, PENNSYLVANIA.

HEADLIGHT.

Application filed August 5, 1921. Serial No. 490,034.

*To all whom it may concern:*

Be it known that we, JAMES A. DARSIE and GEORGE DARSIE, citizens of the United States, residing at Pittsburgh, in the county of Allegheny and State of Pennsylvania, have invented certain new and useful Improvements in Headlights, of which the following is a specification.

Our invention is for a headlight for vehicles, especially automobiles, and relates particularly to a headlight designed to give good road illumination and reduce the glare in the eyes of persons approaching in the opposite direction.

In automobile lamps, as generally made, a parabolic reflection is provided, at the center of which is an electric bulb or other source of illumination. The lamps are designed to project a beam of light, the rays of which are only slightly diverging, ahead of the car. The glare of such lamps on the eyes of persons approaching in the opposite direction is very annoying, while the road is illuminated only with a very limited area. Consequently, efforts have been made to eliminate glare and at the same time obtain good, diffused road illumination. To this end various types of prismatic lenses have been produced which are secured to the front of the lights, and which, by their refractive power, succeed to a limited extent in bending the rays downwardly and diffusing them to give illumination to the front, and to the sides of the road in advance of the automobile. Such lenses, however, have not been very successful in eliminating the glare. This is chiefly because of two factors which have not been successfully eliminated. One is, that reflectors, especially the polished spun metal reflectors used on automobiles, are not so perfect that all of the rays striking against them, are reflected at the true theoretical angle of a perfect reflecting surface. The second reason is, that all such prismatic lenses are molded or pressed, and at the line formed between the adjacent prism surfaces the light rays are refracted at various angles, presumably by reason of imperfections on and in the glass. These lines of juncture produce a glare when viewed from almost any angle.

The present invention has for its object to accomplish the desired results by reflection rather than by refraction.

Further objects are to provide an improved and durable construction in which the reflecting parts will be protected from the weather, and to provide a reflector which may be manufactured at a reasonable cost.

Our invention may be understood by reference to the accompanying drawings in which.

Figure 4:
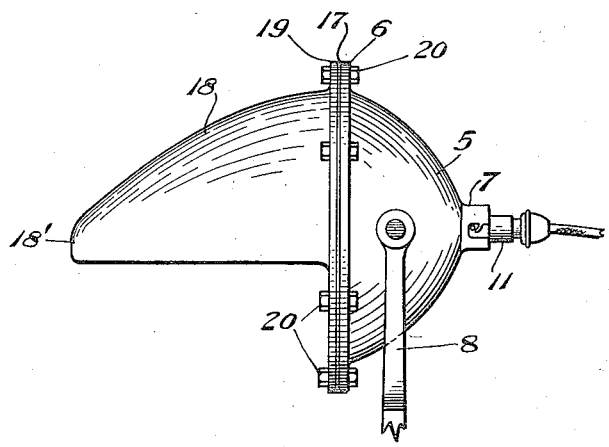
Figure 4 is a side elevation thereof.

Referring to the drawings, 5 indicates an outer shell or casing of a headlight, which shell may be of any suitable standard or preferred construction. As shown, it is provided with an outwardly turned flange 6, and a socket receiving bushing 7. It may be attached to the vehicle, by any suitable means, such as by the support 8 (see Figure 4), in which it is pivotally carried.

Inside the shell 5 is a reflector designated generally by the numeral 9. It has a parabolic reflecting surface 10, at the center of which is an opening to enable the lamp socket 11 to pass therethrough. An incandescent electric bulb is indicated at 12. Extending in advance of the front portion of the reflector are forwardly projecting side reflectors 13, which are curved, or concaved on their inner surfaces. The lower edges of said sides are preferably below the center of the reflector, that is, below the bulb. The tops of the sides are curved, as indicated at 14, and they converge at the top of the reflector, forming a short flange portion at 15.

Figure 5:
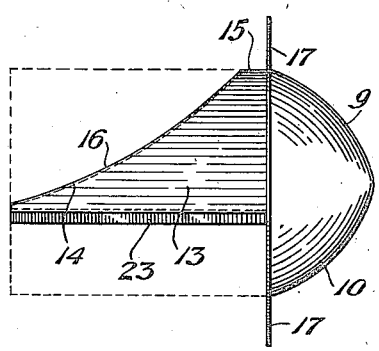
Figure 5 is a side elevation of the reflector itself, indicating the method of forming it.
Figure 6:
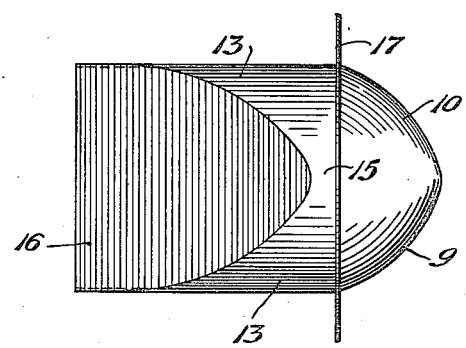
Figure 6 is a top plan of the reflector shown in Figure 5.

The reflector is best shown in Figures 5 and 6. In making it, it is preferably spun from sheet metal, the concave portion first being formed, and then the sides are drawn out in the form of a cylinder, as indicated in dotted lines in Figure 5. Then the cylinder is cut away to shape the side portions 13. Thus the sides 13 and concaved or parabolic reflector 10 are integral.

Soldered or otherwise secured to the sides 13 is a top reflector or shield 16. It is formed from a flat piece of suitable sheet metal curved to conform to the curvature of the top 14 of the sides 13. This curve may be in the form of a portion of an ellipse or circle, but is preferably parabolic.

The inner surfaces of the entire reflector are nickled and highly polished. The reflector is supported in the casing 5 in spaced relation thereto by means of a flange, or straps, fixed to the reflector and indicated at 17, which are are bolted or clamped to the flange 6. Also bolted to the flange 6 is a hood 18 having an annular flange 19 thereon; the bolts for securing the hood 18 and straps or flange 17 to the casing 5 are indicated at 20. The hood 18 is preferably convexed on its outside, so that it is spaced away from the forwardly extending reflector surfaces, which it serves to protect. It has a downwardly extending lip at 18' that extends in front of the end of the reflector.

Suitably held in the headlight by guide members 21, is a horizontal plate of ordinary glass 22, and at 22$^a$ is a vertical plate of glass. These plates of glass merely serve to protect the reflecting surfaces from the weather. The lip 18' keeps the glass 22 from sliding out forwardly.

Figure 1:
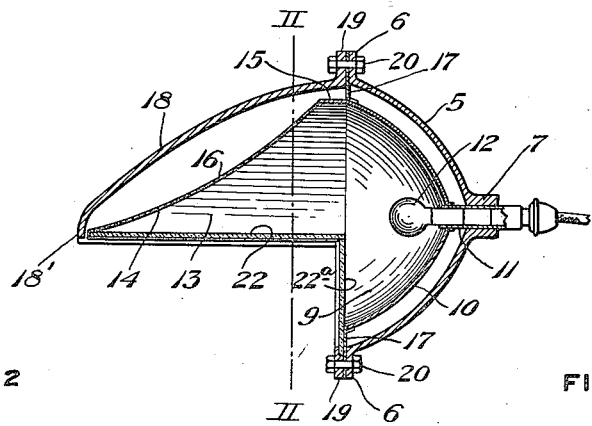
Figure 1 is a vertical longitudinal section through a headlight constructed in accordance with our invention.
Figures 2, 3:
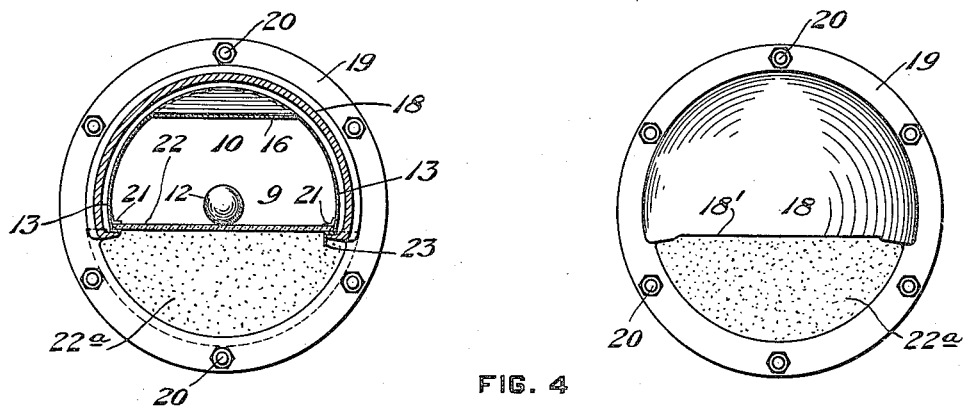
Figure 2 is a transverse section on line II—II of Figure 1.
Figure 3 is a front elevation of one of the headlights.

It desired, one of the side reflectors 13 may extend a little lower than the other, as indicated at 23 in Figure 2. This is for the purpose hereinafter described.

Figure 7:
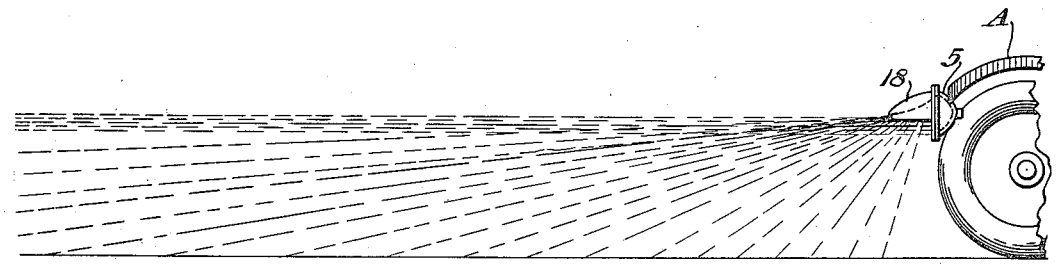
Figure 7 is a diagrammatic side elevation, indicating the path of the light rays.
Figure 8:
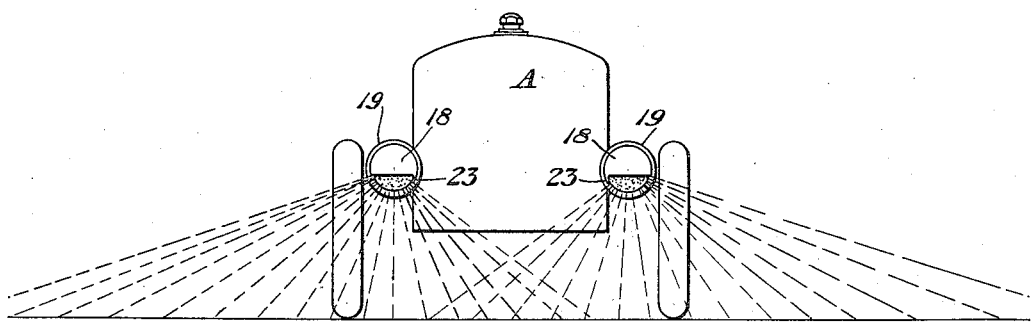
Figure 8 is a similar front view indicating the manner in which lateral illumination is obtained.

In use, the lamps are mounted in the usual manner on the vehicle, indicated in Figures 7 and 8, by A. They may be inclined downwardly at a slight angle to the horizontal. The parabolic reflector 10 directs the rays from bulb 12 in a parallel or slightly diverging path. The rays reflected from the lower portion of the reflector 10 travels in an unobstructed path ahead of the vehicle, as indicated in Figure 7. The lamps, being positioned less than four feet above the ground, do not reflect these unobstructed rays in a path which is ordinarily in the line of vision of a person approaching in the opposite direction, especially if the lights are inclined to the horizontal. These rays serve to illuminate the road at a considerable distance in advance of the car. If, by reason of imperfections in the lower part of the reflector, some of the beams are thrown off at an oblique angle, most of them will be obstructed by the forwardly extending shield and reflecting surfaces and directed down onto the road.

Those rays which are reflected from the upper portion of the parabolic reflector 10, and those which are projected forwardly by the bulb or other source of illumination 12, are obstructed by the curved top shield or reflector 16. As the angle of incidence equals the angle of reflection, some of the rays will be reflected downwardly to a point almost immediately in advance of the vehicle wheels, while others will travel at various angles onto the road in advance of the car. If the top reflector 16 were a flat mirror, it will be readily understood that it would reflect an image to the ground which would correspond to the area and shape of the portion of the reflector 10, the rays from which it obstructs. By bending the reflector 16 into a curve so that it is convex to the reflector 10, the image is distorted longitudinally into a part of an ellipse. Thus a path of light is thrown ahead of the vehicle from a point immediately in advance of the front wheels to a point where some of the unobstructed rays leaving the lower portion of the reflector hit the ground. As the forwardly extending reflecting surfaces extend to a point below the bulb, none but reflected rays can be projected to a distance far in advance of the vehicle. Thus it is normally impossible for any of the direct rays from the the bulb reaching an observer standing in front of the vehicle.

The concaved surfaces 13 catch any lateral rays and project them downwardly and to the sides of the road, of course reflecting the rays to the side opposite which they originally traveled. Good illumination can thereby be obtained at each side of the light from a point almost immediately in front thereof to a considerable distance in advance of the vehicle. None of these rays, however, will be reflected upwardly, so that there is no glare in the eyes of a person disposed in a plane above the lower edge of the sides. By extending the inner sides down further than the outer sides, as at 23, the rays will not overlap to a considerable extent in the middle of the road, as indicated in Figure 8.

Headlights constructed in accordance with our invention have been made and used with considerable success, the undesirable glare being practically absent, except of course, when the vehicle is rising over the crest of a hill, and good diffused road illumination is obtained. The reflecting surfaces are all practically invisible to the eye of an observer in a plane above the plane of the bottom of lip 18'. Furthermore, the edges of the glass are all shielded so that there is no glare from this source.

While we are aware that hoods have been tried at the front of headlights, it has not been proposed to arrange them in such manner that parallel incident rays will be projected downwardly and forwardly at divergent angles to throw an elongated path of light in advance of the vehicle.

We claim:

1. A headlight comprising a source of illumination, a reflector at the rear of said source of illumination, an inclined deflector member which extends forwardly from the reflector and has a convex surface disposed toward the reflector, said inclined deflector member extending downwardly only partly across the path of a beam of light projected forwardly by the reflector, the lower part of the front of the lamp being entirely open, whereby said convex deflector may deflect incident rays in an unobstructed downwardly and forwardly extending path.

2. In a headlight, a source of illumination, a reflector at the rear thereof, a forwardly extending inclined convex deflector in advance of the reflector, the convexed surface being disposed toward the source of illumination, said inclined convexed deflector extending diagonally across the upper part only of the path of a beam of light projected forwardly by the source of illumination and reflector at the rear thereof.

3. A headlight comprising a casing, a source of illumination therein, a reflector therein, and a curved inclined shield extending from the top thereof downwardly part way only across the front of the casing, the remaining area of the front of the lamp being open to the passage of light, said shield having a convex reflecting surface disposed opposite the reflector and adapted to reflect the incident beams in an elongated path downwardly and forwardly of said first reflector.

4. A headlight comprising a casing, a source of illumination therein, a reflector therein, a shield at the front of the light disposed in such manner as to obstruct the upper part of a beam of light therefrom, said shield having a convex reflecting surface disposed toward the source of illumination and sides, the convex reflecting surface being arranged to distort the incident rays of light to cast an elongated path of illumination in advance of said first reflector, the lower part of the obstructed beam being reflected from the convex reflecting surface at a lesser angle to the horizontal than the upper part of the obstructed beam.

5. A headlight comprising a casing, a source of illumination therein, a reflecting surface in the casing, a shield at the front of the headlight arranged to obstruct the upper part of a beam of light therefrom, said shield having a transversely flat, longitudinally convex reflecting surface and sides, one of the sides extending lower than the other.

6. A headlight comprising a casing, a source of illumination therein, a reflector therein, a shield at the front of the headlight disposed in such manner as to obstruct the upper part of a beam of light therefrom, said shield having a convex reflecting surface designed to reflect the incident rays from the first reflector downwardly and forwardly thereof, and sides having concaved reflecting surfaces.

In testimony whereof we affix our signatures.

JAMES A. DARSIE.
GEORGE DARSIE.